(12) United States Patent
Crudele et al.

(10) Patent No.: US 9,535,609 B2
(45) Date of Patent: *Jan. 3, 2017

(54) AUTOMATICALLY MANAGING THE STORAGE OF A VIRTUAL MACHINE

(71) Applicant: International Business Machines Corporation, Armonk, NY (US)

(72) Inventors: Michele Crudele, Rome (IT); Francesco Latino, Bari (IT); Bernardo Pastorelli, L'Aquila (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,805

(22) Filed: Jul. 15, 2015

(65) Prior Publication Data

US 2015/0317082 A1    Nov. 5, 2015

Related U.S. Application Data

(63) Continuation of application No. 13/728,664, filed on Dec. 27, 2012, now Pat. No. 9,128,745.

(51) Int. Cl.
*G06F 3/06* (2006.01)
*G06F 9/455* (2006.01)

(52) U.S. Cl.
CPC .......... *G06F 3/0607* (2013.01); *G06F 3/0631* (2013.01); *G06F 3/0653* (2013.01); *G06F 3/0665* (2013.01);
(Continued)

(58) Field of Classification Search
CPC ................. G06F 9/45533; G06F 2009/4557; G06F 9/5077; G06F 3/0631; G06F 2009/45583; G06F 2009/45579; G06F 9/45558; G06F 3/0607; G06F 3/0653; G06F 3/0685; G06F 3/0665
(Continued)

(56) References Cited

U.S. PATENT DOCUMENTS 8,103,776 B2    1/2012  DeHaan
2011/0066823 A1  3/2011  Ando et al.
(Continued)

FOREIGN PATENT DOCUMENTS

EP    1 783 594 B1    11/2011

OTHER PUBLICATIONS

U.S. Appl. No. 13/728,664.
(Continued)

*Primary Examiner* — Jasmine Song
(74) *Attorney, Agent, or Firm* — Stephen J. Walder, Jr.; Gail H. Zarick

(57) ABSTRACT

Mechanisms are provided for automatically expanding a virtual storage of a virtual machine. The virtual machine monitors a usage of the virtual storage of the virtual machine. The virtual machine determines, based on the monitoring of the usage of the virtual storage, whether to expand the virtual storage of the virtual machine. In response to the virtual machine determining to expand the virtual storage of the virtual machine, a virtual machine manager executes one or more operations to expand the virtual storage. The monitoring and determining may be performed by a virtual storage management agent executing within the virtual machine and which may send an expansion request to an authorization engine to request expansion of the virtual storage.

24 Claims, 3 Drawing Sheets

(52) U.S. Cl.
CPC ......... *G06F 3/0685* (2013.01); *G06F 9/45558* (2013.01); *G06F 2009/45579* (2013.01); *G06F 2009/45583* (2013.01)

(58) Field of Classification Search
USPC .......................................... 711/6, 170; 718/1
See application file for complete search history.

(56) References Cited

U.S. PATENT DOCUMENTS

| | | |
|---|---|---|
| 2011/0131443 A1 | 6/2011 | Laor et al. |
| 2011/0185120 A1 | 7/2011 | Jess |
| 2011/0258388 A1 | 10/2011 | Soran et al. |
| 2011/0276963 A1 | 11/2011 | Wu et al. |
| 2011/0282837 A1 | 11/2011 | Gounares et al. |
| 2013/0262811 A1 | 10/2013 | Taguchi |
| 2014/0189682 A1 | 7/2014 | Crudele et al. |

OTHER PUBLICATIONS

"How to extend a data volume in Windows Server 2003, in Windows XP, in Windows 2000, and in Windows Server 2008", Microsoft, Article ID: 325590, http://support.microsoft.com/kb/325590, Last Review: Sep. 11, 2011—Revision 14.0, accessed on Dec. 3, 2012, 5 pages.

"VMware Communities: Increasing vmdk disk space in Virtual Center", VMware, Inc., http://communities.vmware.com/thread/18373?tstart=5, accessed on Oct. 23, 2012, 7 pages.

"What's New in VMware vSphere 4.0", VMware, Inc., http://www.vmware.com/support/vsphere4/doc/vsp_40_new_feat.html, accessed on Dec. 3, 2012, 7 pages.

Marshall, Paul, "Increase your Virtual machine's disk capacity", GeekZilla, http://www.geekzilla.co.uk/View18A035DE-06FF-4EA6-BC77-57D431CD50DD.htm, accessed on Oct. 23, 2012, 6 pages.

Sivathanu, Sankaran et al., "Storage Management in Virtualized Cloud Environment", 2010 IEEE 3rd International Conference on Cloud Computing (CLOUD), Jul. 5-10, 2010, pp. 204-211.

U.S. Appl. No. 15/209,066.

AUTOMATICALLY MANAGING THE STORAGE OF A VIRTUAL MACHINE

This application is a continuation of application Ser. No. 13/728,664, filed Dec. 27, 2012, status allowed.

BACKGROUND

The present application relates generally to an improved data processing apparatus and method and more specifically to mechanisms for automatically managing the storage of a virtual machine.

A virtual machine (VM) is a software implementation of a machine (i.e. a computer) that executes programs like a physical machine. Virtual machines are separated into two major categories, based on their use and degree of correspondence to any real machine. A system virtual machine provides a complete system platform which supports the execution of a complete operating system (OS). These usually emulate an existing architecture, and are built with the purpose of providing a platform to run programs where the real hardware is not available for use (for example, executing software on, otherwise, obsolete platforms) or having multiple instances of virtual machines lead to more efficient use of computing resource, both in terms of energy consumption as well as cost effectiveness (known as hardware virtualization, the key to a cloud computing environment), or both. In contrast, a process virtual machine (also, language virtual machine) is designed to run a single program, which means that it supports a single process. Such virtual machines are usually closely suited to one or more programming languages and built with the purpose of providing program portability and flexibility (amongst other things). An essential characteristic of a virtual machine is that the software running inside is limited to the resources and abstractions provided by the virtual machine it cannot extend outside of its virtual environment.

Server based virtual machines are one way in which computing power and storage may be provided to client applications as a service. That is, for each client application session, or for a plurality of client application sessions, from the same or different client computing devices, a client virtual machine may be created on the server computing device that represents a separate instance of the server computing device, and associated resources, for that client application session or plurality of client application sessions. This client virtual machine may have its own instance of an operating system, allocated virtual memory resources, and the like.

However, as mentioned above, client application processes are limited by the resources allocated to the virtual machine. In order to modify such allocation of resources, a skilled human operator must manually reconfigure the allocation of resources and even modify the physical resources of the physical machines to accommodate the need for more resources. This process can be very complex in environments where client segregation is present and virtual machines are connected to segregated networks. Client segregation refers to public clouds or, more generally, multi-tenant environments, where cloud resources (compute, storage, and networks) can be dedicated to tenants. The cloud infrastructure must guarantee that those resources are kept separate and secured so that only the assigned tenant can access them in a secure way. Thus, virtual machines and storage devices must be configured to be accessed only from the networks dedicated to the tenant, i.e. must be segregated. Managing a multi-tenant environment adds complexity because the cloud environment must be more sophisticated to guarantee segregation of resources and the quality of service per each tenant. The cloud environment must manage the resource pools and the quota of resources that each tenant can use on the pools with over-commitment policies possibly being in place to optimize the use of the resources across tenants. In such an environment, a process of reconfiguring a virtual machine is more critical and error prone compared with a private, single tenant environment.

SUMMARY

In one illustrative embodiment, a method, in a data processing system, is provided for automatically expanding a virtual storage of a virtual machine executing in the data processing system. The method comprises monitoring, by the virtual machine, a usage of the virtual storage of the virtual machine. The method further comprises determining, by the virtual machine, based on the monitoring of the usage of the virtual storage, whether to expand the virtual storage of the virtual machine. Moreover, the method comprises, in response to the virtual machine determining to expand the virtual storage of the virtual machine, executing, by a virtual machine manager, one or more operations to expand the virtual storage.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
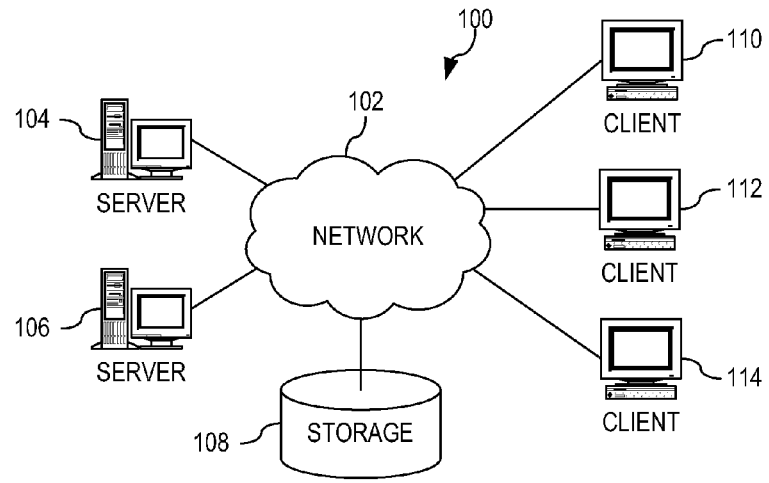
FIG. 1 is an example diagram of a distributed data processing system in which aspects of the illustrative embodiments may be implemented.

The illustrative embodiments provide mechanisms for automatically managing the storage of a virtual machine. The illustrative embodiments utilize an agent executing within the virtual machine that monitors the amount of free storage space available to the virtual machine, such as in a virtual disk or storage allocated to the virtual machine. If the agent within the virtual machine detects a storage shortage, based on one or more established threshold free space available values, the agent is configured to automatically initiate a process for automatically enlarging the virtual disk or storage capacity allocated to the virtual machine.

The process for automatically enlarging the virtual disk or storage involves automatically generating and transmitting a request to an authorization engine by a virtual machine manager (VMM) to obtain authorization to increase the virtual disk/storage allocated to the virtual machine (VM). If the authorization engine determines that an increase in the virtual disk/storage for the VM is authorized, the agent of the VM interacts with the VMM to increase the virtual disk/storage allocation to the VM. The agent may further interact with the operating system (OS) image of the VM to extend the partitions the OS has established such that they use all of the increased virtual disk/storage space, i.e. all of the new virtual disk/storage area is allocated to one or more partitions of the OS.

In this way, the mechanisms of the illustrative embodiments allow the VM to automatically increase its own amount of virtual disk/storage on a server machine without requiring the interaction of a skilled human administrator to perform the increase in virtual disk/storage space allocation. This avoids issues with VM operation in situations where no human administrator is available to service the server computing device or situations where a VM is associated with a computing device where a human administrator is present but does not have the required skill or security access to complete the operation of increasing the virtual disk/storage space allocation. With the mechanisms of the illustrative embodiments, the VM may expand its own virtual disk/storage while the VM remains running and servicing client requests from client computing devices/applications. The mechanisms of the illustrative embodiment also allow the completion of the operation for increasing virtual disk/storage space allocation to a VM while running the VM in a complex network environment implementing network segregation, such as in the case of virtual local area networks (VLANs), cloud systems, firewalls, and virtual routing and forwarding environments which allow using overlapping IP address ranges for different tenants.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
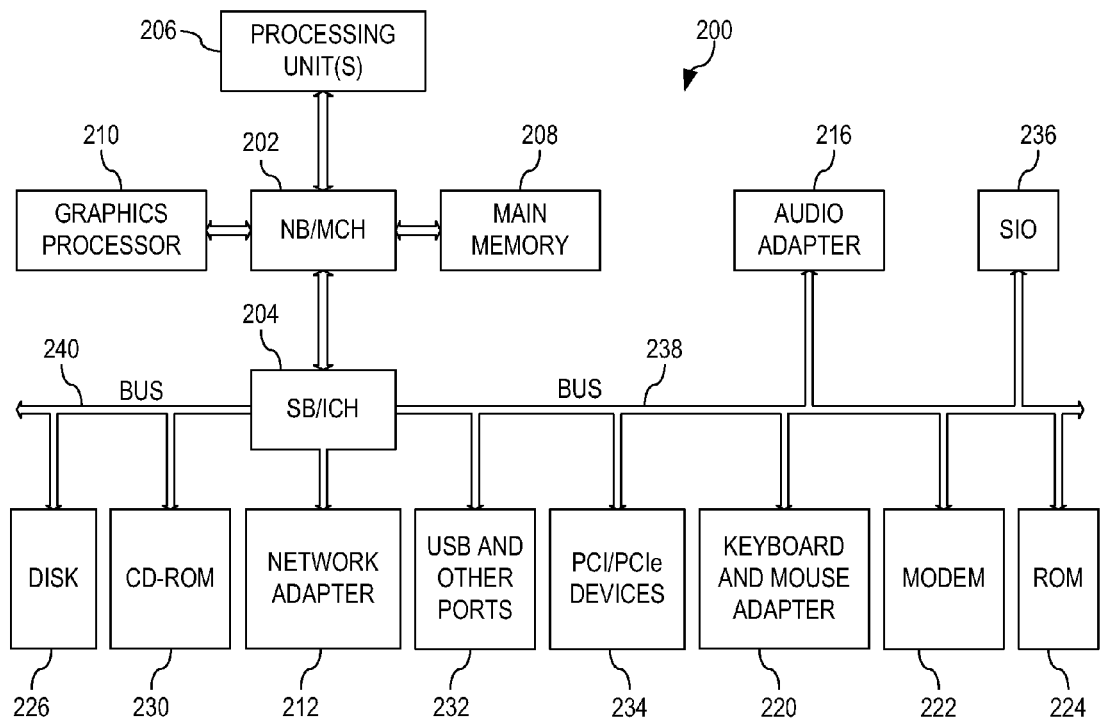
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Referring again to FIG. 1, one or more applications executing on one or more of the client computing devices 110-114 may access applications, services, resources, or the like, made available by one or more of the servers 104, 106. For purposes of the following description, it will be assumed that the client computing device 110 runs a client application which accesses an application, service, resources, or the like, of server 104, for example. The applications, services, resources, or the like, of the server 104 may be provided as a part of a virtual machine (VM) executing on the server 104. The VM may be one of a plurality of VMs provided by the server 104. Each VM may have its own operating system (OS) instance, or guest OS, executing within the VM, and may have its own VM resources, including virtual disk/storage allocation, application instances, device driver instances, processor resource allocations, and the like. In accordance with the illustrative embodiments set forth herein, the VM may execute, within the VM, a virtual storage management agent that automatically monitors the VM's utilization of its allocated virtual disk/storage (hereafter referred to simply as "virtual storage") to determine if an expansion or increase in the virtual storage should be automatically requested and then automatically interacting with mechanisms internal and external to the VM to accomplish the expansion or increase in virtual storage.

The VMs are preferably managed by a virtual machine manager (VMM) executing on the server 104. The VMM may be, for example, implemented as a hypervisor, part of a hypervisor, or part of another type of virtual machine management mechanism. The VMMs of a plurality of servers 104, 106 may be managed by a VMM manager which may be provided within one of the servers 104, 106, or in a separate computing device coupled to the network 102. In one illustrative embodiment, the VMM of a server 104 may implement logic, either provided in hardware, software, or a combination of hardware and software, for providing an authorization engine and virtual disk/storage management engine. Alternatively, the authorization engine may be provided as logic external to the VMM, such as in the VMM manager, or a separate component, in the same or a separate computing device from the server 104 but coupled to the network 102. The authorization engine may work in conjunction with the virtual storage management (VSM) agent of the VM to process requests from the VSM agent to determine if requested expansion/increase of allocated virtual memory in the VM should be authorized or not.

Physical storage, such as hard disk storage, solid state drive storage, flash memory storage, or other types of storage devices, may be managed by a storage manager which may interface with the VMMs, the VMM manager, and other components of the illustrative embodiments, as described hereafter, to accomplish the automated management of VM storage. The storage manager is an optional component and is not necessary to the operation of the illustrative embodiments. However, in one illustrative embodiment, the network attached physical storage 108 may be used to provide backend storage devices for the VMs of one or more of the servers 104, 106 and may have an associated storage manager for providing the network connectivity to network 102 and may manage the physical redundant arrays of independent disks (RAIDs) of the physical storage 108 to provision the storage for allocation to VMs of the servers 104, 106. Alternatively, or in addition, other physical storage associated with the servers 104, 106 may be used to provide such backend storage devices for the VMs and may or may not make use of a storage manager.

Figure 3:
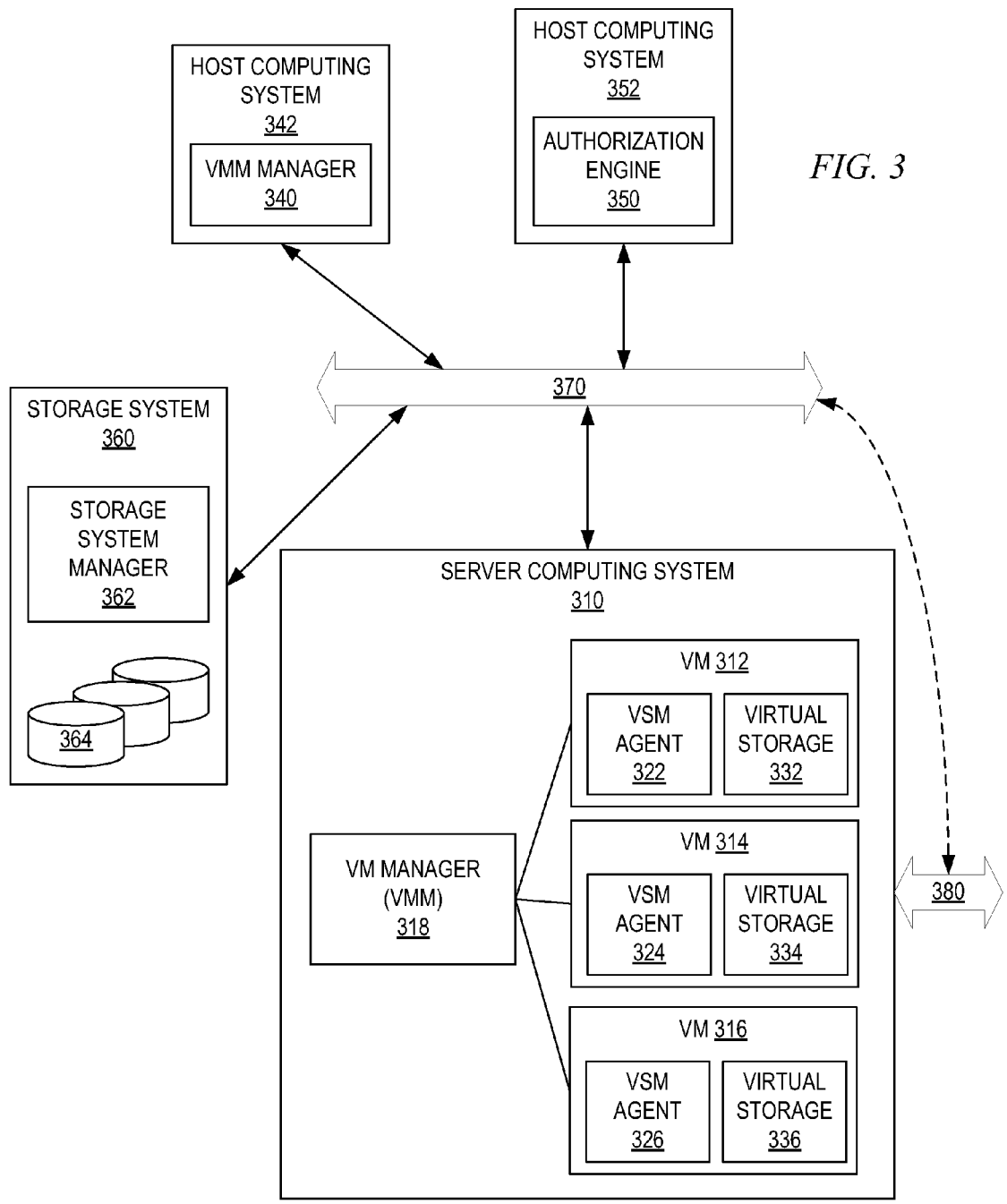
FIG. 3 is an example block diagram illustrating the primary operational components of a virtual machine based architecture in accordance with one illustrative embodiment.

FIG. 3 is an example block diagram illustrating the primary operational components of a virtual machine based architecture in accordance with one illustrative embodiment. As shown in FIG. 3, the primary operational elements of one illustrative embodiment of the present invention comprises a server computing device 310 that executes or otherwise implements a plurality of virtual machines (VMs) 312-316 and a virtual machine manager (VMM) 318 that manages the VMs 312-316. In one illustrative embodiment, the VMM 318 may be a hypervisor, for example. Within each of the VMs 312-316, a virtual storage management (VSM) agent 322-326 is executed that automatically monitors the associated VM's utilization of its allocated virtual storage 332-336 and automatically generates requests for expansion or increase in the allocated virtual storage 332-336 when determined necessary.

The VMM manager 340 is provided in the same or separate computing device from that of server computing device 310 (the example in FIG. 3 shows the VMM manager 340 being provided in a separate computing device 342). The VMM manager 340 manages the VMMs 318 of the various server computing devices (only one 310 of which is shown in FIG. 3, but the network may in fact comprise a plurality of such server computing devices which may together be managed by a single VMM manager 340). The VMM manager 340 may work in conjunction with the VMMs 318 and the optional storage manager 362, to service authorized requests for expansion/increase of the a VM's allocated virtual storage, e.g., the allocated virtual storage 332 of a VM 312. The VMM manager 340 may interact with the authorization engine 350 to check for availability of the storage required by the VM (the VMM manager 340 knows the amount of space left on the "datastore" where the VM is running) Based on the request from the VMM manager 340, the authorization engine 350 can make different decisions, based on its policies. For example, if there is no more space on the datastore where the VM is running, the authorization engine 350 may autonomously request the VMM manager 340 to "live migrate" the VM onto a different datastore. Alternatively, the authorization engine 350 could simply deny the expansion request and send an alert to an administrator.

In some cases, the expansion of the virtual storage 332 may require more physical storage to be allocated to the server computing device 310 and/or the VM 312, in which case the storage manager 362 may be used to perform the actual allocation of additional physical storage 364 of the storage system 360. For example, if a request for an expansion of the virtual storage 332 allocated to a VM 312 is determined to be authorized, the authorization result may be transmitted to the VMM manager 340, or directly to the requesting VMM 318, via the management network 370. The VMM manager 340, or requesting VMM 318, may then perform the necessary operations to expand or increase the allocated virtual storage 332 of the VM 312. The VMM 318 and VMM manager may provide various application programming interfaces (APIs) (not shown), which may be used to increase the size of the virtual storage 332 of the VM 312 (note that a VM can have more than one virtual storage, or virtual disk). There are also virtualization tools that are installed in the Guest OS of the VM 312 and that can be called by the VSM agent 322 to communicate with the VMM 318 to initiate virtual storage 332 or virtual disk expansion. In one illustrative embodiment, one possible data flow for expanding the virtual storage 332 may be that the VSM agent 322, once receiving authorization from the authorization engine 350, may use the VM's guest OS tools to request that the VMM 318 expand the virtual storage 332 or virtual disk (as described hereafter with regard to FIG. 4, for example). In another illustrative embodiment, the authorization engine 350 may request that the VMM manager 340 expand the virtual storage 332 or virtual disk of the VM 312, and then communicates back the result to the VSM agent 322, which then will only need to perform step 500 of FIG. 4 hereafter: call guest OS tools (command line or api) for modifying the partition of the virtual storage 332 or virtual disk so that the file system can start using the new storage.

The authorization engine 350 provides the logic for determining whether a request for an expansion of allocated virtual storage 332 to a VM 312, as received from a VSM agent 322 executing within the VM 312, should be granted or denied. The authorization engine 350 is shown in FIG. 3 as being provided on a separate computing device 352 from the other computing devices/systems 310, 342, and 360. However, the authorization engine 350 may, in some illustrative embodiments, be hosted on one or more of the computing devices/systems 310, 342, and 360, and may be integrated with one or more of the components of these computing devices/systems 310, 342, and 360. For example, the authorization engine 350 may be integrated with the VMM manager 340 or the VMM 318.

The computing devices/systems 310, 342, 352, and 360 are in communication with each other via a management network 370 which provides communication pathways, via hardware and software mechanisms for communication, for management commands, data, packets, or the like, to facilitate the management of resources on the various computing devices/systems. In particular to the illustrative embodiments, the management network 370 provides a communication pathway for communicating requests for expansion/increase of virtual storage to VMs, receiving responses to such requests, exchanging commands and data for performing the expansion/increase of virtual storage to VMs, and the like. The management network 370 may be part of a local area network, wide area network, the Internet, or a combination of networks. For example, the management network 370 may be comprised of management connections between endpoint computing devices coupled to the network 102 in FIG. 1. The management network 370 may optionally be connected to the user network 380 which provides the communication pathways for exchanging data, packets, and communications with user applications.

The management network 370 is used by the management mechanisms, such as the VSM agent 322, the authorization engine 350, the VMM 318, the VMM manager 340, and the like, while the user network 380 is used by the end users of the VMs 312-316 to access the services provided by the VMs 312-316. A VM 312-316 may be equipped with two or more virtual network interface cards (vNICs): one configured on the management network 370, and one configured on the user network 380. Note that may be other vNICs. For example, in a server that runs a database, the server may have a vNIC configured on a high-speed storage network. The management network 370 is not routed to the Internet, while the user network 380 usually does route to the Internet, such that the VMs' services are accessible to clients over the Internet. The management network 370 could be accessible from the Internet, but only through virtual private network (VPN) devices (a cloud administrator working from home might need to log into a VM 312-316 to fix problems, for example).

In operation, the VSM agent 322 executing inside of the VM 312 either continuously, periodically, or in response to the occurrence of particular events within the operation or execution of the VM 312, determines the amount of free space currently present in the allocated virtual storage 332. The periodic implementation of this monitoring may be based on an established schedule, the elapse of a particular clock or counter, or the like. For example, the monitoring may be performed every X milliseconds, seconds, minutes, at a particular time of day, or the like. The event based implementation of the monitoring may be in response to a write operation being performed within the VM 312 as a result of executing an application within the VM 312, a predetermined number of write operations being performed, a cache miss operation, or any other event or operation that may be indicative of an increase in utilization of the allocated virtual storage 332, for example.

The monitoring of the actual amount of virtual storage 332 being used by the VM 312 or that is free may be performed in any suitable manner. In one illustrative embodiment, the monitoring of the utilization of the virtual storage 332 by the VM 312 is achieved by periodically polling the partition sizes with native operating system calls/tools, e.g., fdisk or diskpart. The total of the partition sizes may be compared against the total amount of virtual storage 332 allocated to the VM 312 to determine how much of the virtual storage 332 is allocated to partitions within the VM 312 with the difference between the total of the partition sizes and the total amount of virtual storage 332 allocated to the VM 312 being the amount of free space available within the virtual storage 332 of the VM 312.

In another illustrative embodiment, file system calls made by a virtual file system of the VM 312 may be hooked, i.e. have instructions associated with them that cause an interrupt or exception to be thrown which invokes an interrupt or exception handler that determines the amount of virtual storage 332 being used and how much of the virtual storage 332 is free (or not used). Of course other methods and mechanisms for determining the amount of used virtual storage 332 and/or the amount of free (or unused) virtual storage 332 may be used without departing from the spirit and scope of the illustrative embodiments.

Having determined the amount of used/free virtual storage 332, the amount of used/free virtual storage 332 may be compared against one or more pre-defined threshold values to determine if a request for expansion/increase in the virtual storage 332 should be automatically generated. For example, a predetermined threshold may specify an amount of free space where, if the actual measured amount of free virtual storage 332 equals or falls below this threshold value, a request for an expansion/increase in allocated virtual storage 332 may be automatically generated. In another illustrative embodiment, the predetermined threshold may specify an amount of used virtual storage 332 where, if the actual measured amount of used virtual storage 332 meets or exceeds this threshold value, then a request for an expansion/increase in allocated virtual storage 332 may be automatically generated.

For example, the predetermined threshold value may be 10% free space, such that if the actual measured amount of free space in the virtual storage 332 of the VM 312 is equal to or less than 10%, then a request for expansion/increase in the virtual storage 332 may be automatically generated and sent to the VMM 318. Alternatively, the predetermined threshold value may be 90%, such that if the actual measured amount of used space in the virtual storage 332 of the VM 312 is equal to or greater than 90%, then a request for expansion/increase in the virtual storage 332 may be automatically generated and sent to the VMM 318. Of course a combination of thresholds may be used and, in embodiments where more detailed information about the manner in which the virtual storage is being used, thresholds associated with the various amounts of virtual storage used in various ways may be utilized. For example, if a first portion of virtual storage is used to store code, and a second portion of the virtual storage is used to store client data, various thresholds could be associated with these types of usage and used in a combined manner to determine whether an expansion or increase of the virtual storage is to be requested.

The VMM 318 may forward the expansion/increase request, or may generate a separate expansion/increase request, to the authorization engine 350 for evaluation. The expansion/increase request may specify the particular VM 312 requesting the expansion/increase, an identity of a client application or user associated with the VM 312, and/or other information that may be the basis for an evaluation as to whether the expansion/increase request should be granted or denied. In one illustrative embodiment, the expansion/increase request contains the unique identifier of the VM 312. Based on this unique identifier, the authorization engine 350 may correlate the unique identifier with a user or tenant (if in a multi-tenant environment) that owns the VM 312 based on a data structure that stores information about the user/tenant and the associated unique identifier. The user/tenant has been configured to use up to a given quota of storage with this storage quota value being stored as part of the user/tenant information. Thus, one rule for allowing/denying the expansion/increase request is to check whether the user/tenant would be exceeding the storage quota value if the expansion/increase request were authorized; if so, then the request may be denied otherwise, the request may be authorized. This storage quota value may be a quota of physical storage of the datastore backing the virtual machine and providing the physical storage with which the virtual storage is associated.

The amount of storage of an expansion/increase request may be a fixed configuration parameter of the system. Alternatively, the VSM agent 322 may implement an algorithm that determines the amount of storage expansion/increase that is to be requested, and this value may be included in the expansion/increase request, based on previous requests: e.g., start asking for a relatively small amount of storage expansion/increase and then increase the requested amount based on how frequently the virtual storage 332 or virtual disk is detected as becoming full. Of course, other rules and criteria for determining whether to grant/deny an expansion/increase request may be used without departing from the spirit and scope of the illustrative embodiments.

The determination as to whether to grant or deny the expansion/increase request may be performed automatically or semi-automatically. In an automatic implementation of the authorization engine 350 one or more pre-defined rules may be applied against the information received in the expansion/increase request, and/or management information maintained by the VMMs 318 and/or VMM manager 340, to determine if conditions of the one or more rules are met. If the conditions of the one or more rules are met, then the corresponding action to either grant/deny the expansion/increase request is performed. For example, the simple rule may be to check the current allocated amount of virtual storage 332 relative to a maximum allowed virtual storage for the particular user, client application, or service associated with the requesting VM 312. In a multi-tenant environment, where multiple different users make use of VMs 312-316 that are backed by the same physical resources, or a service provider sells services to various customers where each customer gets his/her own VM 312-316, the rules that are applied may first ensure that the particular user/customer has not yet consumed their virtual storage quota assigned to him/her before allowing an expansion/increase in the virtual storage for the user/customer's VM.

In a semi-automatic embodiment, for example, an escalation process may be initiated that requires human approval for each escalation, or at least a subset of the escalations, of the size of the allocated virtual storage 332. That is, the authorization engine 350 may generate an initial recommendation for whether the expansion/increase request should be granted or denied, and this recommendation may be sent to a human user for approval. If the human user approves the recommendation, then the corresponding action, e.g., grant/deny the expansion/increase request, is performed. In some illustrative embodiments, the first escalation, and possibly one or more additional escalations, may be performed automatically with subsequent escalations in the size of the allocated virtual storage 332 may require human approval.

It should be appreciated that these are only examples of ways in which to determine whether to grant or deny a request to expand/increase the virtual storage 332 assigned to a VM 312. Other mechanisms for determining whether to grant/deny an expansion/increase request may be used without departing from the spirit and scope of the illustrative embodiments.

If the authorization engine 350 determines to deny the expansion/increase request, a response is sent back to the VMM 318 which forwards the response to the VSM agent 322 thereby notifying the agent 322 of the denial and informing the agent 322 to no longer generate automated expansion/increase requests. This denial may be communicated to the user, client application, or service, with which the VM 312 is associated via the guest OS of the VM 312 so that actions can be taken to accommodate the need for additional virtual storage 332. For example, a message may be output to a user, an administrator, or the like, so that they may evaluate whether to enter into an arrangement for obtaining additional virtual storage 332, e.g., agreeing to pay additional fees to a provider of the server computing system and/or storage system, to obtain additional storage space.

If the authorization engine 350 determines to grant the expansion/increase request, the authorization engine 350 may return a response to the VMM 318 associated with the requesting VM 312 (or the VMM manager 340 that manages the VMM 318), requesting that the VMM 318 or VMM manager 340 increase the size of the virtual storage 332 associated with the VM 312. Once the size of the virtual storage 332 has been expanded/increased by the VMM 318 and/or VMM manager 340, the information regarding the expanded/increased virtual storage 332 may be communicated to the VSM agent 322 executing within the VM 312. The VSM agent 322 may then interact with the guest OS of the VM 312 to have the guest OS increase the size of partitions hosted by the virtual storage 332. For example, a guest OS command or API may be used to increase the size of the partitions hosted by the virtual storage 332, e.g., a "diskpart" command in the Microsoft Windows™ operating system may be used in one illustrative embodiment.

This method works successfully also in the case where there is no direct connectivity between the network hosting the VM and the network hosting the authorization component, e.g., in a case where the VM does not have a vNIC configured on the management network 370 or, for security reasons, the VSM agent is not provided with connectivity to the management network 370. In such a scenario, an additional component may be used, e.g., an agent running in the hypervisor. The agent running in the guest OS can use some VM to host communication mechanism (like setting properties on the VM that can be read from the hypervisor) to communicate the disk shortage to the agent running in the hypervisor. This second agent can communicate with the authorization component and start the authorization process; in case of success or failure it can communicate back the outcome to the agent running the guest OS.

Thus, the illustrative embodiments provide mechanisms for automatically adjusting the storage allocated to virtual machines using monitoring mechanisms within the virtual machines themselves. Thus, the illustrative embodiments are concerned with the storage status from within the virtual machine, not the status as viewed from outside the virtual machine. While other mechanisms are concerned with expanding a virtual machine's use of storage to an already allocated maximum amount of storage allowed to the virtual machine, the illustrative embodiments allow for an expansion or increase in the amount of storage allocated to the virtual machine, thereby expanding or increasing the maximum storage allocated to the virtual machine to thereby exceed the storage past its previous maximum.

In addition, the illustrative embodiments may expand or increase the storage allocated to a virtual machine while the virtual machine is operating. That is, the need for more storage is detected in advance by the virtual storage management agent executing in the virtual machine and monitoring the virtual storage of the virtual machine. After authorization for the expansion of the virtual storage is received, in response to a request sent by the agent, the agent itself may perform the expansion of the virtual storage and make it visible to the guest OS of the virtual machine. Thus, there is no interruption of service of the virtual machine. This is especially important for virtual machines running server applications that provide services to client computing devices twenty-four hours a day, seven days a week. The automatic storage adjustment mechanisms operate even in the case of network segregation where there is no direct network connectivity between the virtual machine and the management network hosting the virtual machine manager and other management components.

Figure 4:
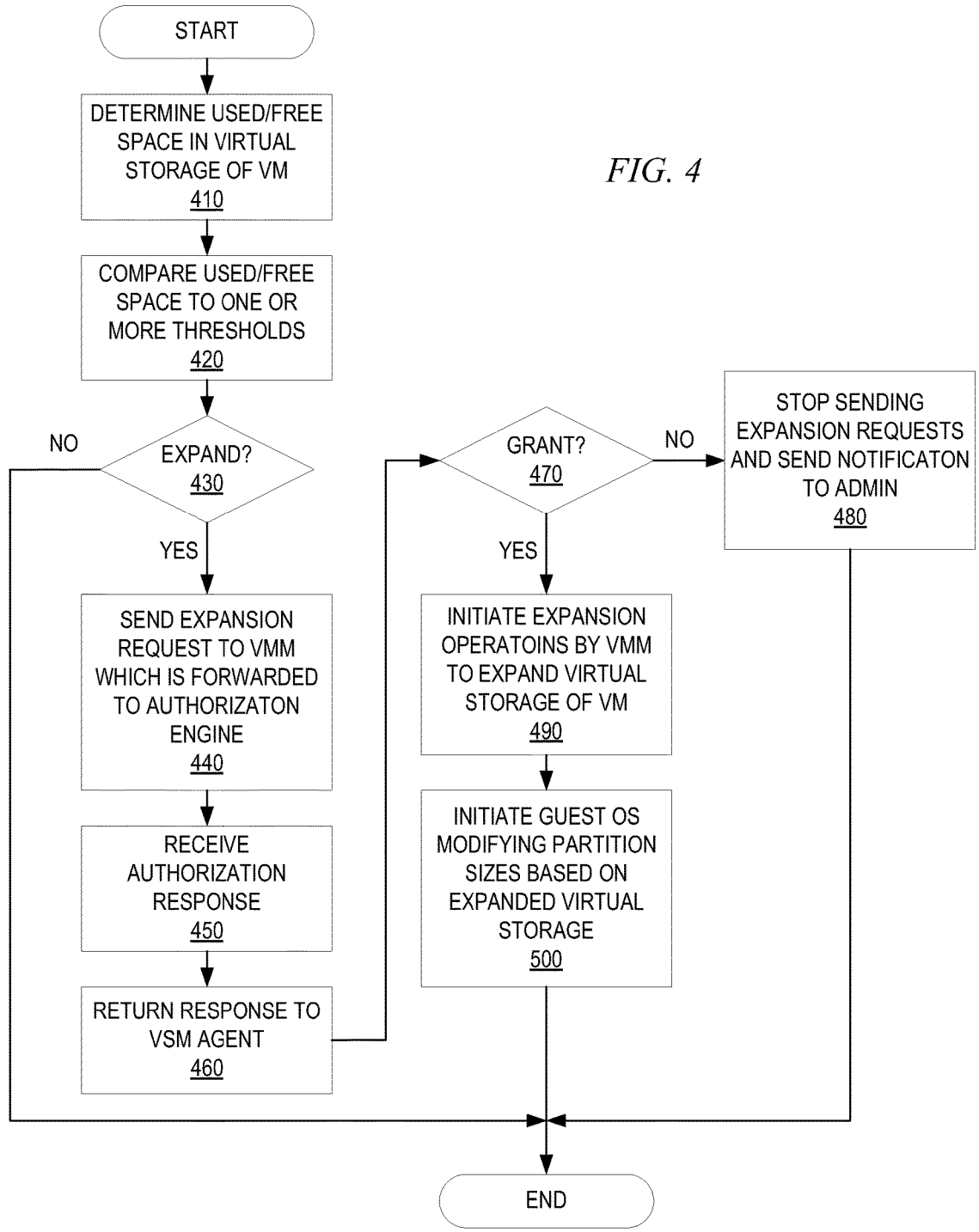
FIG. 4 is a flowchart outlining an example operation for automatically expanding or increasing the size of a virtual storage associated with a virtual machine in accordance with one illustrative embodiment.

FIG. 4 is a flowchart outlining an example operation for automatically expanding or increasing the size of a virtual storage associated with a virtual machine in accordance with one illustrative embodiment. The operation outlined in FIG. 4 may be implemented continuously, periodically, or in response to a detected event. The operation outlined in FIG. 4 may be implemented, for example, by a virtual storage management agent executing within a virtual machine executing on a server computing device in combination with a virtual machine manager of the server computing device.

As shown in FIG. 4, the operation starts by determining a current amount of used and/or free space in the virtual storage of the virtual machine (step 410). As mentioned above, there are many ways that this may be accomplished, such as by using native operating system calls/tools to poll the operating system for the current storage usage, hooking file system calls, or the like. The actual used and/or free space values are compared against one or more thresholds (step 420). A determination is made as to whether results of the comparison indicate that an expansion/increase request should be transmitted (step 430). If not, then the operation terminates. If so, then an expansion/increase request is sent to the virtual machine manager which forwards the virtual machine manager to an authorization engine (step 440).

The authorization engine evaluates the expansion/increase request against a set of one or more rules to determine whether to grant or deny the expansion/increase request and returns a response to the virtual machine manager (step 450). The virtual machine manager returns the response to the virtual storage management agent (460) which determines whether the response is a grant or denial of the request (step 470). If the response is a denial, then the agent configures itself to no longer send expansion/increase requests and sends a message to a user/administrator of the need for an expansion/increase in the virtual storage associated with the virtual machine (step 480). As noted above, the user/administrator may take actions to authorize the expansion/increase of the virtual storage, such as by paying a fee or the like.

If the response is a grant of the request, then the agent initiates the expansion/increase in the virtual storage of the virtual machine by instructing the virtual machine manager to expand/increase the virtual storage (step 490). Once the virtual storage has been increased by the virtual machine manager, the agent instructs the guest operating system to modify the partition sizes within the virtual file system to make use of the expanded/increased virtual storage (step 500). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for automatically expanding a virtual storage of a virtual machine executing in the data processing system, comprising:
   monitoring, by the virtual machine, a usage of the virtual storage of the virtual machine;
   determining, by the virtual machine, based on the monitoring of the usage of the virtual storage, whether to expand the virtual storage of the virtual machine; and
   in response to the virtual machine determining to expand the virtual storage of the virtual machine, executing, by a virtual machine manager, an operation to expand the virtual storage, wherein determining whether to expand the virtual storage of the virtual machine comprises determining whether to expand the virtual storage based on a current amount of physical storage allocated to the virtual machine and a storage quota value indicating a total acceptable amount of physical storage to be allocated to the virtual machine.

2. The method of claim 1, wherein monitoring the usage of the virtual storage of the virtual machine comprises monitoring the usage of the virtual storage using a virtual storage management agent executing within the virtual machine, and wherein the virtual storage management agent further performs the determining operation.

3. The method of claim 2, wherein determining, based on the monitoring of the usage of the virtual storage, whether to expand the virtual storage of the virtual machine comprises:
   comparing, by the virtual storage management agent, the usage of the virtual storage to a threshold value; and
   determining, by the virtual storage management agent, based on results of the comparison of the usage of the virtual storage to the threshold value, whether to expand the virtual storage of the virtual machine.

4. The method of claim 3, wherein executing an operation to expand the virtual storage comprises performing an interaction between the virtual storage management agent and the virtual machine manager to increase the virtual storage allocated to the virtual machine.

5. The method of claim 4, wherein executing an operation to expand the virtual storage comprises performing an interaction between the virtual storage management agent and an operating system (OS) image of the virtual machine to extend at least one partition of the OS such that all of the increased virtual storage is allocated to partitions of the OS.

6. The method of claim 4, wherein executing an operation to expand the virtual storage comprises:
   sending an expansion request, from the virtual machine manager, to an authorization engine which determines whether to authorize or deny the expansion request, wherein the virtual machine manager executes an operation to increase the virtual storage allocated to the virtual machine in response to the authorization engine authorizing the expansion request.

7. The method of claim 6, wherein the operation executed by the virtual machine manager (VMM) to increase the virtual storage allocated to the virtual machine comprises interacting with a VMM manager that manages a plurality of VMMs to cause the VMM manager to interact with a storage system controller to increase the virtual storage allocated to the virtual machine.

8. The method of claim 6, wherein the data processing system hosts a plurality of virtual machines, each virtual machine having an associated tenant such that there are a plurality of tenants and a plurality of virtual machines, and wherein:
   the expansion request comprises a unique identifier of the virtual machine,
   the authorization engine correlates the unique identifier with tenant information specifying a tenant that is associated with the virtual machine, and
   the authorization engine determines whether to authorize or deny the expansion request based on the tenant information.

9. The method of claim 8, wherein:
   the virtual storage management agent determines an amount of additional virtual storage to be allocated to the virtual machine,
   the expansion request comprises an indicator of the amount of additional virtual storage to be allocated to the virtual machine, and
   the authorization engine determines whether to authorize or deny the expansion request based on the amount of additional virtual storage to be allocated to the virtual machine.

10. The method of claim 1, wherein the monitoring and determining operations are performed while the virtual machine operates to service client requests.

11. A computer program product comprising a non-transitory computer readable medium having a computer readable program stored therein, wherein the computer readable program, when executed on a data processing system, causes the data processing system to:
- monitor, by a virtual machine, a usage of the virtual storage of the virtual machine;
- determine, by the virtual machine, based on the monitoring of the usage of the virtual storage, whether to expand the virtual storage of the virtual machine; and
- execute, by a virtual machine manager, in response to the virtual machine determining to expand the virtual storage of the virtual machine, an operation to expand the virtual storage, wherein determining whether to expand the virtual storage of the virtual machine comprises determining whether to expand the virtual storage based on a current amount of physical storage allocated to the virtual machine and a storage quota value indicating a total acceptable amount of physical storage to be allocated to the virtual machine.

12. The computer program product of claim 11, wherein monitoring the usage of the virtual storage of the virtual machine comprises monitoring the usage of the virtual storage using a virtual storage management agent executing within the virtual machine, and wherein the virtual storage management agent further performs the determining operation.

13. The computer program product of claim 12, wherein determining, based on the monitoring of the usage of the virtual storage, whether to expand the virtual storage of the virtual machine comprises:
- comparing, by the virtual storage management agent, the usage of the virtual storage to a threshold value; and
- determining, by the virtual storage management agent, based on results of the comparison of the usage of the virtual storage to the threshold value, whether to expand the virtual storage of the virtual machine.

14. The computer program product of claim 13, wherein executing an operation to expand the virtual storage comprises performing an interaction between the virtual storage management agent and the virtual machine manager to increase the virtual storage allocated to the virtual machine.

15. The computer program product of claim 14, wherein executing an operation to expand the virtual storage comprises performing an interaction between the virtual storage management agent and an operating system (OS) image of the virtual machine to extend at least one partition of the OS such that all of the increased virtual storage is allocated to partitions of the OS.

16. The computer program product of claim 14, wherein executing an operation to expand the virtual storage comprises:
- sending an expansion request, from the virtual machine manager, to an authorization engine which determines whether to authorize or deny the expansion request, wherein the virtual machine manager executes an operation to increase the virtual storage allocated to the virtual machine in response to the authorization engine authorizing the expansion request.

17. The computer program product of claim 16, wherein the operation executed by the virtual machine manager (VMM) to increase the virtual storage allocated to the virtual machine comprises interacting with a VMM manager that manages a plurality of VMMs to cause the VMM manager to interact with a storage system controller to increase the virtual storage allocated to the virtual machine.

18. The computer program product of claim 16, wherein the data processing system hosts a plurality of virtual machines, each virtual machine having an associated tenant such that there are a plurality of tenants and a plurality of virtual machines, and wherein:
- the expansion request comprises a unique identifier of the virtual machine,
- the authorization engine correlates the unique identifier with tenant information specifying a tenant that is associated with the virtual machine, and
- the authorization engine determines whether to authorize or deny the expansion request based on the tenant information.

19. The computer program product of claim 18, wherein the tenant information includes a storage quota value indicative of a total acceptable amount of physical storage able to be allocated to the tenant, and wherein the authorization engine determines whether to authorize or deny the expansion request based on a current amount of physical storage allocated to the tenant and the storage quota value.

20. The computer program product of claim 18, wherein:
- the virtual storage management agent determines an amount of additional virtual storage to be allocated to the virtual machine,
- the expansion request comprises an indicator of the amount of additional virtual storage to be allocated to the virtual machine, and
- the authorization engine determines whether to authorize or deny the expansion request based on the amount of additional virtual storage to be allocated to the virtual machine.

21. The computer program product of claim 11, wherein the monitoring and determining operations are performed while the virtual machine operates to service client requests.

22. An apparatus, comprising:
a processor; and
a memory coupled to the processor, wherein the memory comprises instructions which, when executed by the processor, cause the processor to:
- monitor, by a virtual machine, a usage of the virtual storage of the virtual machine;
- determine, by the virtual machine, based on the monitoring of the usage of the virtual storage, whether to expand the virtual storage of the virtual machine; and
- execute, by a virtual machine manager, in response to the virtual machine determining to expand the virtual storage of the virtual machine, one or more operations to expand the virtual storage, wherein determining whether to expand the virtual storage of the virtual machine comprises determining whether to expand the virtual storage based on a current amount of physical storage allocated to the virtual machine and a storage quota value indicating a total acceptable amount of physical storage to be allocated to the virtual machine.

23. A method, in a data processing system, for automatically expanding a virtual storage of a virtual machine executing in the data processing system, comprising:
- monitoring, by an agent executing with the virtual machine, a usage of the virtual storage of the virtual machine;
- determining, by the agent, based on the monitoring of the usage of the virtual storage, whether to expand the virtual storage of the virtual machine;
- sending, by the agent, in response to determining to expand the virtual storage of the virtual machine, an authorization request to an authorization engine executing on a separate computing device to request authorization to expand the virtual storage of the virtual machine;

receiving an authorization response from the authorization engine; and in response to the authorization response providing authorization to expand the virtual storage of the virtual machine, executing, by a virtual machine manager, an operation to expand the virtual storage of the virtual machine, wherein determining whether to expand the virtual storage of the virtual machine comprises determining whether to expand the virtual storage based on a current amount of physical storage allocated to the virtual machine and a storage quota value indicating a total acceptable amount of physical storage to be allocated to the virtual machine.

24. A method, in a data processing system, for automatically expanding a virtual storage of a virtual machine executing in the data processing system, comprising:

monitoring, by the virtual machine, a usage of the virtual storage of the virtual machine;

determining, by the virtual machine, based on the monitoring of the usage of the virtual storage, whether to expand the virtual storage of the virtual machine;

in response to the virtual machine determining to expand the virtual storage of the virtual machine, executing, by a virtual machine manager, an operation to expand the virtual storage; and determining an amount of additional virtual storage to be allocated to the virtual machine, wherein determining whether to expand the virtual storage of the virtual machine comprises authorizing or denying the expansion based on the amount of additional virtual storage to be allocated to the virtual machine.

* * * * *